US007107923B2

(12) United States Patent
Chauncey et al.

(10) Patent No.: US 7,107,923 B2
(45) Date of Patent: Sep. 19, 2006

(54) VESSEL PROTECTION DEVICE PARTICULARLY SUITED FOR PROTECTING DOCKED MARINE VESSELS

(76) Inventors: Jeffrey B. Chauncey, 2811 NE. 36th St., Lighthouse Point, FL (US) 33064; Herb Weinstock, 6383 Pine Hurst Cir. West, Tamarac, FL (US) 33321

(*) Notice: Subject to any disclaimer, the term of this patent is extended or adjusted under 35 U.S.C. 154(b) by 0 days.

(21) Appl. No.: 11/258,370

(22) Filed: Oct. 26, 2005

(65) Prior Publication Data

US 2006/0086301 A1    Apr. 27, 2006

Related U.S. Application Data

(60) Provisional application No. 60/621,777, filed on Oct. 26, 2004.

(51) Int. Cl.
*B63B 59/02* (2006.01)
(52) U.S. Cl. ....................................... 114/220
(58) Field of Classification Search ................ 405/213; 114/219, 220, 230.15–230.17
See application file for complete search history.

(56) References Cited

U.S. PATENT DOCUMENTS 2,417,849 A * 3/1947 Walters et al. .............. 114/220
3,084,517 A * 4/1963 Beel ........................... 405/213
4,773,349 A * 9/1988 McKinney ................... 114/219
5,429,063 A * 7/1995 Rosenkranz ................. 114/220
6,332,421 B1 * 12/2001 Leonard et al. .............. 114/220

OTHER PUBLICATIONS

Taylor Made dock wheel literature available from Taylor Made Products, a division of The Nelson A. Taylor Co., Inc., of Gloverville, New York 12078, undated (2 pages).

* cited by examiner

*Primary Examiner*—Ed Swinehart
(74) *Attorney, Agent, or Firm*—Shlesinger, Arkwright & Garvey LLP.

(57) ABSTRACT

Vessel protection device protects a floating vessel from rubbing against pilings or a stationary dock and eliminates the need for hanging or fixed vessel fenders. A fixed attachment may secure the protection device to a dock, for example, and be configured for supporting spring-loaded solid or air-filled rollers. It may be permanent and spaced in a manner so as to stand off a floating vessel while tied to a stationary dock or pilings, thus allowing for vessel movement associated with vertical tidal action, current, and light wave or wave motion. The arm and roller section may also be rotatable from a vertical to a horizontal position, thus allowing for an untied vessel to move freely along the rollers oriented in their horizontal position while the vessel is either departing or docking, and oriented vertically, such as when the vessel is docked.

11 Claims, 4 Drawing Sheets

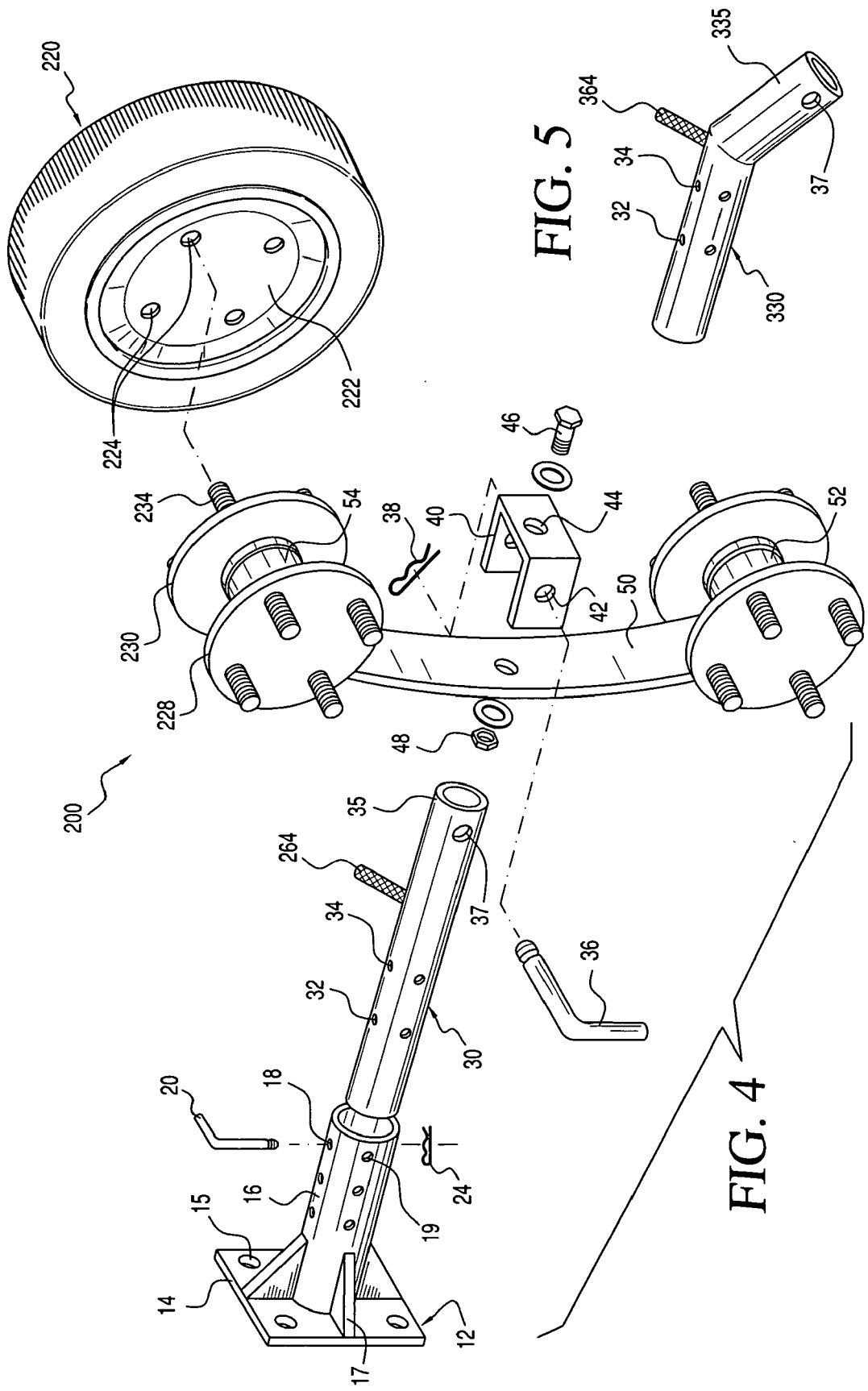

VESSEL PROTECTION DEVICE PARTICULARLY SUITED FOR PROTECTING DOCKED MARINE VESSELS

CROSS REFERENCE TO RELATED APPLICATION

This application claims priority of application No. 60/621,777, filed Oct. 26, 2004, and which is incorporated herein by reference.

FIELD OF THE INVENTION

The invention relates to vessel protectors. More particularly, the invention relates to docking vessel and docked vessel protectors. Even more particularly, the invention relates to vessel protectors having a guided protection roller which may be spring-loaded and pivotable to maintain a desired orientation, vessel guidance, vessel tensioning, and offset relative to a dock or other fixed surface.

BACKGROUND OF THE INVENTION

Stationary vessel protection devices are known. Examples of known relatively fixed vessel protection devices include padded seawalls, vehicle tires placed between vessels and docks, air-filled bumpers fixed relative to docks and docked vessels, and the like.

A known dock wheel design for being mounted on a front corner of a dock adjacent to where docking vessels enter a slip include a dock wheel, such as the Taylor Made dock wheel available from Taylor Made Products, a division of The Nelson A. Taylor Co., Inc., of Gloversville, N.Y. 12078.

Additional known devices include various sizes of inflatable or solid fenders (e.g. inflated/inflatable wheels) that hang off a boat or vessel. Sometimes such known devices are used adjacent a piece of wood that protects the vessel from the piling.

Another known device includes one or more hollow support masts each having a slotted channel vertically disposed along its length.

A further known device includes a fiberglass type whip, which is like an antenna, which attaches to a dock, and which will hold a small vessel off of a dock by means of a taut line tied between the vessel and the whip.

A further known device include a rubber type cushioning strip that attaches to a dock or piling thus allowing the vessel to rub against it as it moves.

Known marine vessel protection devices have drawbacks such as the inability to automatically maintain a docked vessel offset from a side of a dock or piling, or in a boat slip, even as tides come in and out, storm waters raise the levels of the water in which the vessel is docked, currents shift, and the like.

It may be seen that there is a need for a vessel protection device which overcomes these and other drawbacks of the prior art.

OBJECTS AND SUMMARY OF THE INVENTION

It is an object of the invention to overcome the drawbacks of the prior art devices.

Another object of the invention is to provide a vessel protection device which is easier to use, requires less time and energy to install against a vessel to be protected when docked, and which more accurately maintains a desired spacing between a dock and a vessel.

A further object of the invention is to provide a vessel protection device which reduces or eliminates the need to continually readjust the length and tension of docking lines which secure a docked vessel in its slip as conditions, such as tides, wind, and waves, change.

A further object of the invention is to provide a vessel docking device which has a longer useful life than known devices.

Yet another object of the invention is to provide a vessel docking device which may be readily adjusted to suit different sizes of vessels and docks and water level conditions.

Another object of the invention is to provide a vessel protection device which requires no additional fenders or devices.

A still further object of the invention is to provide a vessel protection device which may be oriented in a variety of positions including vertical, horizontal, and other orientations; a vertical orientation being used when the vessel is docked, for example, and a horizontal orientation being used when the vessel is entering or leaving the dock, for example.

In summary, the invention includes a vessel protection device including a mounting arm configured for being attached to a relatively fixed object such as a dock, a cushioning element configured and disposed for engaging a vessel, and a spring supporting the cushioning element and provided between the cushioning element and the mounting arm, so that the cushioning element may be provided at a desired offset from the fixed object and so that the cushioning element may engage the vessel in a desired orientation, in use, during both constant and changing water levels and water force conditions.

The invention may likewise include a leaf spring.

The mounting arm may include an adjustable mounting arm which is configured for providing one or more of a variable length and a variable orientation.

The cushioning element may include a gas-filled element.

The cushioning device may include an inflatable pneumatic tire, which may be rimless, or which may include a rim.

An arm may be provided for adjusting the orientation of the vessel protecting device relative to the vessel being protected.

BRIEF DESCRIPTION OF THE DRAWINGS

FIG. 4 is a partial exploded perspective view, similar to FIG. 2, of a further embodiment of a vessel protection device according to the invention; and FIG. 5 is a front perspective view of a further embodiment of an angled extension arm of a further embodiment of a vessel protection device according to the invention.

It will be appreciated that relative terms such as left, right, up, down, horizontal, and vertical are for convenience only and are not intended to be limiting.

DETAILED DESCRIPTION OF THE INVENTION

An embodiment of the invention will now be described with reference to FIGS. 1 and 2.

Figure 1:
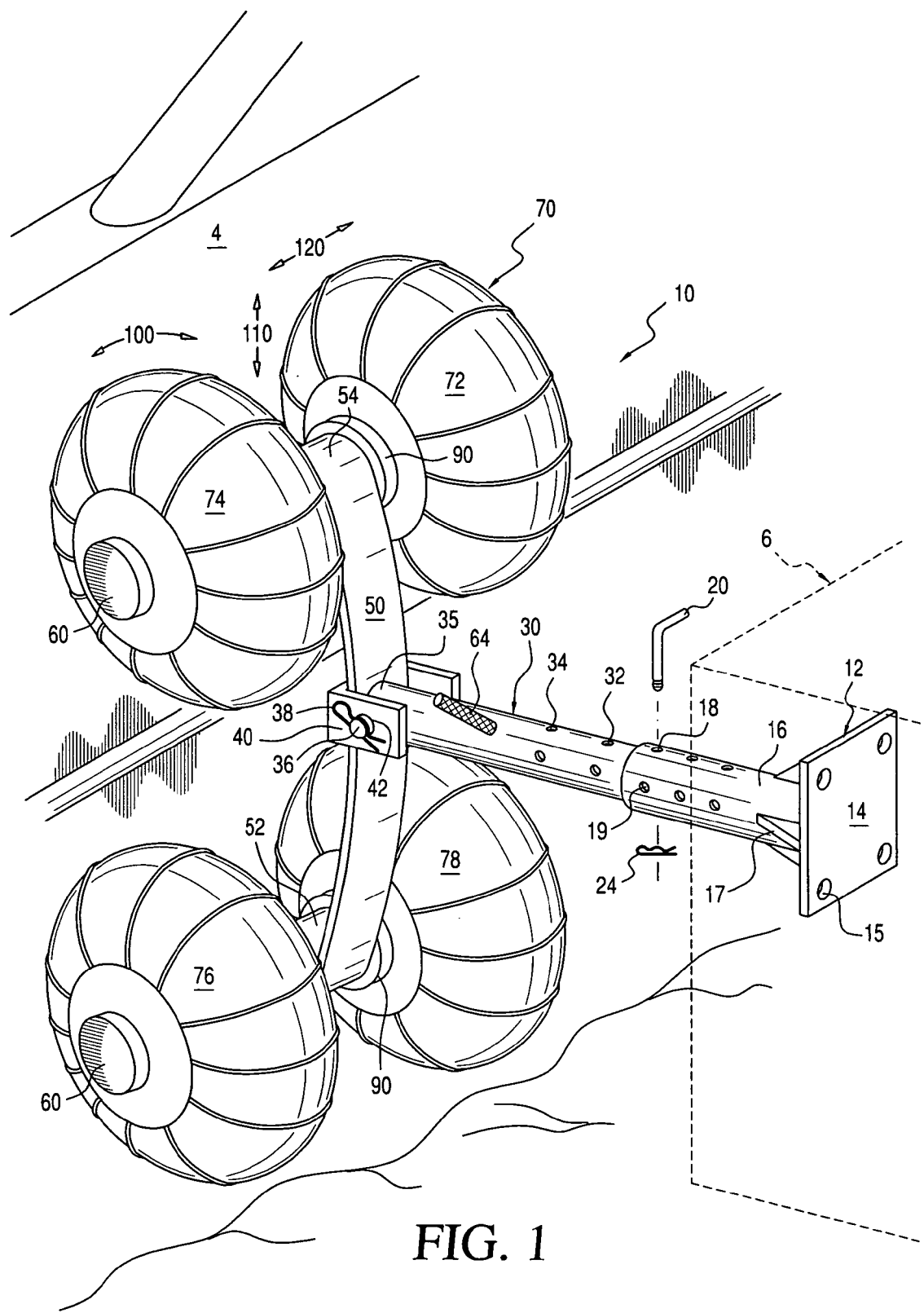
FIG. 1 is a front perspective view of an embodiment of a vessel protection device according to the invention, as viewed from a dock looking toward a vessel, in use.

FIG. 1 shows a vessel 4 and a dock 6 between which a vessel protection device 10 according to the invention is provided.

Vessel protection device 10 or vessel protector may be detachably mounted to dock 6 by use of a mounting bracket 12. Bracket 12 may include a vertical mounting plate 14 having one or more mounting holes 15 by which the mounting bracket 14 may be detachably attached to dock 6. An extension 16 may be provided on mounting bracket 12. Extension 16 may be in the form of a square, rectangular or circular tube, or the like. One or more adjustment holes 18 may be provided on extension 16. Strengthening elements, such as the illustrated plates 17, may be provided to strengthen the connection between the plate 14 and extension 16.

One or more connectors, such as the illustrated holes 19 may be provided in addition to holes 18 on extension 16.

A locking element, such as a locking element or pin 20, may be provided for detachably attaching extension 16 to an angle extension arm 30. A locking element or clip 24 may be provided to ensure that locking pin 20 remains in place, in use.

An extension arm 30 may include one or more attachment elements, such as the illustrated holes 32 and 34, which may be sized and located to align with corresponding ones of holes 18 and 19 in extension 16.

As will be readily appreciated, in use, the desired effective length of extension arm 30 extending outwardly of mounting bracket 12 may be achieved by varying the location of hole 32 relative to hole 18, for example. As shown, in order to obtain the greatest illustrated offset between extension arm 30 and mounting bracket 12, hole 32 would be aligned with hole 18, in use. If the orientation of extension arm 30 were to be varied relative to mounting bracket 12, then, as shown, extension arm 30 may be moved inwardly or outwardly, or rotated, such as through the illustrated angle of about 90° and hole 32 would then be aligned with a corresponding hole 19 in extension arm 16. Thanks to hole 19 being oriented substantially 90° relative to hole 18, the resultant orientation and extension of downwardly extension arm 30 would be changed 90°, and, if desired, moved inwardly or outwardly relative to extension 16, and, hence, relative to dock 6.

In the case where both extension 16 and extension arm 30 were provided with a larger number of mating holes 18, 19, thanks to their respective substantially circular mating cross sections, the distance between an outer end 35 of extension arm 30, as well as the angle at which outer end 35 extends relative to vertical plate 14 could be varied by an even larger number of positions and in even smaller gradations. In other words, instead of the 90° variation as shown, as well as 180° and 270° variations, in the case where 8 evenly spaced holes, for example, were provided on a circular cross section of mating components of one or both of extension arm 30 and extension 16, it will be readily apparent that 45° offsets could be achieved and a larger number of varying positions would result. It is likewise contemplated that additional variation and indeed, an infinite number of varied positions could be achieved by the substitution of alternate attachment elements between extension 16 and extension arm 30.

An adjustment handle or element 64 may be provided on extension arm 30, for example, to assist in the angular adjustments and distance offsets of extension 30 relative to extension 16. Adjustment handle or element 64 may be oriented at an angle relative to the longitudinal axis of extension arm 30 to make it easier for a user to make the above-described angular distance offset adjustments.

A mounting shaft or pivot element 36 may be provided which mates with a corresponding hole 37 in extension arm 30. Pivot element 36 may be in the form of a locking pin, for example, with a corresponding detachably attached locking element 38 to ensure that locking pin 36 remains in a desired position.

A connection element, such as a U-bracket 40, having a hole 42 or other connection element may be provided for securing a spring 50 to mounting bracket 12. Spring may be in the form of a leaf spring, as shown.

A further connector 44, such as the illustrated hole, may be provided in bracket 40. A connector 46, such as the illustrated bolt or other fasteners, may be inserted through hole 44 and detachably attached by a mating nut 48 or other fastener. A locking nut or locking washer and washer, as needed, may be provided, in the case where a bolt is used.

Spring 50 may be detachably attached to extension arm 30, such as in an outer portion of extension arm 30 in the region of spring 50; and, indeed holes 42 may be aligned with holes 37 of portion 35 and detachably attached thereto by use of pivot 36, as shown.

Spring 50 may be provided with one or more connecting elements 52 and 54, as shown, and in which connecting elements 52 and 54 holes 56 and 58, respectively, have been provided. Optional nylon bushings may be provided in one or more of holes 56 and 58. A threaded end cap 60 may be used for securing a cushioning element, such as the illustrated inflatable wheel 70, to a corresponding shaft 80.

Shaft 80 may extend through a respective hole 58, or may be secured to a threaded hub 90, depending on the intended use. The threaded hub is useful for easing the mounting and dismounting of inflatable wheel 70.

Additional shafts, threaded couplings, end caps, and like fasteners may be provided depending on the intended use.

It will be appreciated that cushioning element 70 may include respective first, second, third, and fourth inflatable wheels 72, 74, 76, and 78.

In use, as seen in FIG. 1, typically each of inflatable wheels 72, 74, 76, and 78 will engage marine vessel 4, in use. As the vessel moves up and down with the tide, for example, the wheels will typically rotate in the direction of arrow 100, as shown in FIG. 1.

In addition, the spring force exerted by spring 50, and extensions 16 and 30, will maintain vessel 4 at a desired offset from dock 6. Depending on currents and tides, for example, greater forces may be applied at some times to upper wheels 72 and 74 than to lower wheels 76 and 78. Thanks to the configuration of the vessel protection device 10 and spring 50, which may be in the form of a leaf spring, as shown, the forces applied by vessel 4, in use, will be partially, if not completely, offset by the reaction forces of the spring.

As will be readily appreciated from considering FIG. 1, the orientation of spring 50, and, indeed, vessel protection device 10, may be considered substantially vertical, and a direction indicated by arrow 120 may be considered substantially horizontal. As discussed above, the substantially horizontal orientation may be the orientation of wheels 70 and spring 50, for example, when vessel 4 is being brought into or moved out of docking.

Thus, the inventive vehicle protection device may be considered a dual-use vessel protection device.

In use, dock lines will be secured to dock 6 and onto the vessel 4 in such a manner as to allow the vessel to move against the wheels or rollers 70 during vertical tidal motion, rocking wave movement, varying wind speeds, and water current changes.

Figure 3:
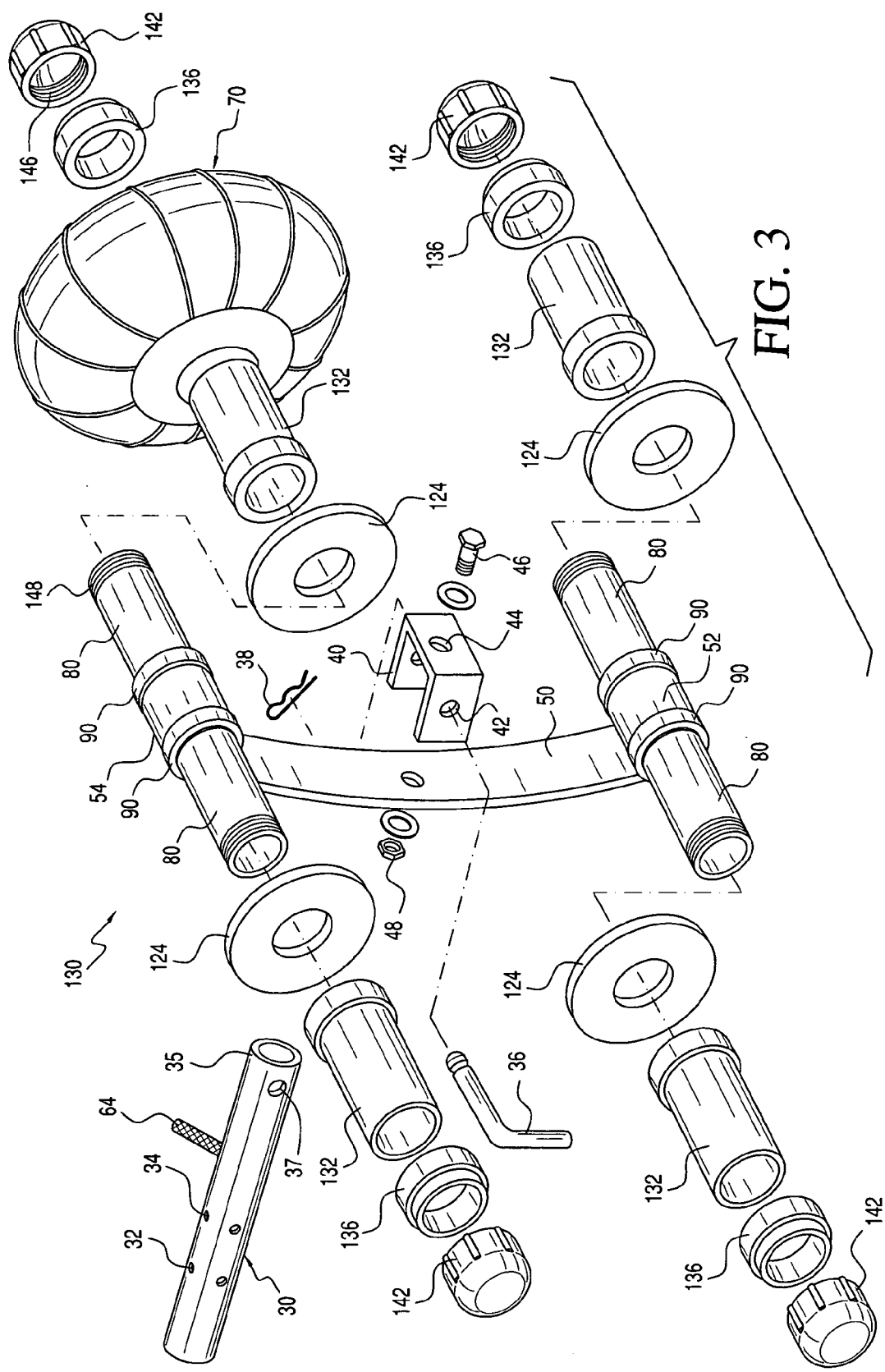
FIG. 3 is a partial exploded perspective view, similar to FIG. 2, of a further embodiment of a vessel protection device according to the invention.

FIG. 3 illustrates a further embodiment of a vessel protection device 130 according to the invention.

Figure 2:
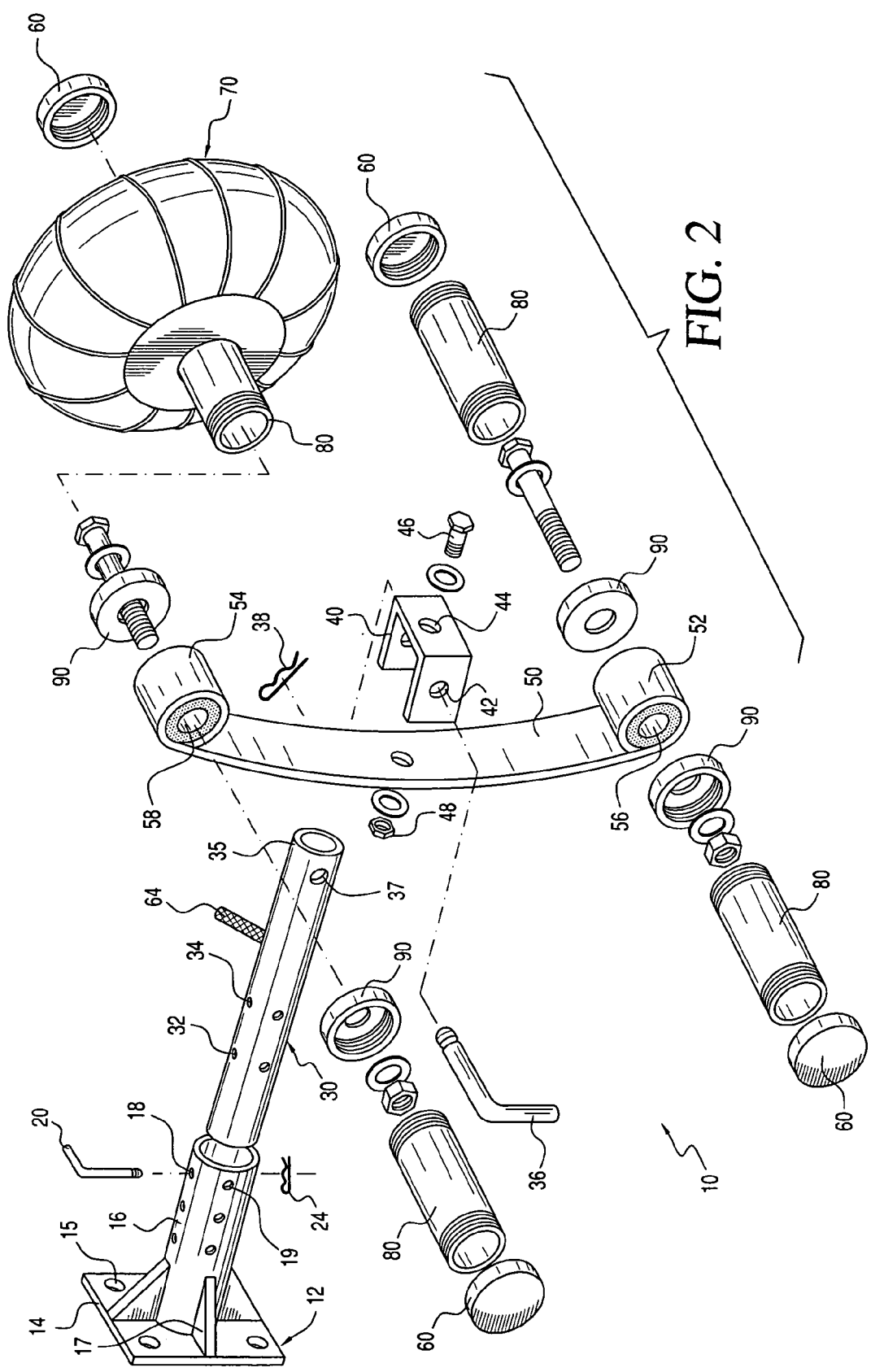
FIG. 2 is a partial exploded view of various components of the vessel protection device of FIG. 1.

Vessel protection device 130 includes features of the FIG. 1 embodiment with the addition of further features, such as the elimination of the nut and bolt of the FIG. 1 embodiment that secure FIG. 1 shaft 80 to FIG. 1 threaded hub 90, as shown in FIG. 2. Instead, the FIG. 3 embodiment may include a sleeve 132, which may be a PVC (polyvinylchloride) pipe. The sleeve 132 protects shaft 80, and serves as the element over which stop 90 may be slid and then glued to sleeve 90, which may likewise be PVC, for example.

Additional mating left and right stops 136 and 142 may secure respective ones of wheels 70 to spring 50.

In addition, the FIG. 3 embodiment may include one or more spacers 124, which may be provided with a hole therein, configured for fitting over one or both of shaft 80 or sleeve 132. Spacers 124 are sized and configured for ensuring that a vessel 4 does not engage one or more of the parts of vessel protection device 130, such as the spring, or, indeed, dock 6 itself, even in the event that gas-filled wheel 70 deflates, in use.

In the event of such deflation of one of wheels 70, spacer 124 would then contact a portion of vessel 4. spacer 124 may be, for example, substantially solid PVC, about 1" thick, and about 6" inches in diameter, when used with protection device 130 configured for securing a vessel such as a personal watercraft, or a yacht about 16 or more feet in length and weighing about 40 gross tons.

FIG. 4 illustrates a further embodiment of a vessel protection device 200 according to the invention.

Vessel protection device 200 may include a tire 200 mounted on a rim 224, for example. One or more holes 224, such as the usual holes for mounting a rim to a hub 230 may be provided. Likewise, mating lug bolts 234 for engagement with holes 224, and lug nuts (not visible in the drawing) are secured to hub 230, such as by welding.

Thanks to the provision of rim 224, spacer 124 may be eliminated, if desired, as in the event that tire 220 lose its cushioning volume of air, then the uninflated tire itself will press against and be retained on rim 222, and will function as a variation of spacer 124. that is, the uninflated tire will keep vessel 4 offset from the remainder of protection device 200, such as the spring, and from the dock 6, for example.

FIG. 5 illustrates a further embodiment of an extension arm 330, configured as an angled extension arm, according to the invention.

Angled extension arm 330 may include a downwardly angled portion 335, and may be used with any of the embodiments of FIGS. 1–4. An adjustment handle or element 64 may be provided on extension arm 330, for example, to assist in the angular adjustments and distance offsets of extension arm 330 relative to extension 16, in use, in a manner similar to the use and of arm 64 as described above in connection with the FIG. 1 embodiment.

Angled extension arm 330 may likewise have a substantially circular cross section. Downwardly extending portion 335 may be secured with a locking pin through hole 37, as described above.

In use, arm 364 may be grasped and manipulated by the user for removing extension arm 330 from mating extension 16 and/or for rotating extension arm 330 relative to extension 16.

In use, for example, bracket 14 may be mounted to a dock or pier, in a manner similar to the use of the embodiment of FIGS. 1–4. the horizontal portion of extension arm 330 may be inserted into an open end of extension 16, and hole 32 may be secured to hole 16, as in FIG. 1. Depending on the desired offset from mounting plate 14 and, hence, the dock 6 to which the mounting bracket 12 is attached, the user will align corresponding holes of extension arm 330 and the horizontal portion of extension arm 330, as will be readily appreciated. Then, locking pin 120 may be inserted through holes 32 and 18 for preventing movement of extension arm 330 relative to extension 16.

If the orientation of downwardly extending portion 335 were to be varied relative to mounting bracket 12, then, angled extension arm 330 may be provided with additional mating holes in one or both of the horizontal and the downwardly extending portion 335. if downwardly extending portion 335, provided with such holes akin to 32 and 34 were to be used, the user would turn remove horizontal portion of arm 330 from extension 16, turn arm 330 around, and insert angled extension arm 330 into extension 16.

It has been found that owing to the configuration of vessel protection device, there are wind and current conditions under which not all of the wheels need engage the vessel at all times, and still achieve the desired securing and offset of the vessel relative to the dock.

It is likewise contemplated that additional variation and indeed, an infinite number of varied positions could be achieved by the substitution of alternate attachment elements between extension 16 and angled extension arm 330, as described above.

Thanks to the pivot arm in the form of a leaf spring, the desired orientation of the cushioning elements or wheels is maintained. The spring in the form of a leaf spring may be attached to a balance point selected to maximize the desired balancing and protective characteristics of the device.

The leaf spring may be straighter, or have a greater curvature than as shown in FIGS. 1–4, and, indeed, may be substantially straight, depending on the desired characteristics, vessel size, expected forces exerted on the vessel and spring, desired location of the application of forces applied to the various upper and lower wheels, in use, and other considerations, as will be readily apparent to a person having ordinary skill in the art.

The mounting bracket may be configured for being permanently or detachably attached to one or both of a substantially vertical, curved, and horizontal surface of a dock, as well as to another relatively fixed object such as a piling, or bulkhead, whether wooden, metal, concrete, or other material, for example.

Thanks to the overall configuration, continual dock line adjustment is unnecessary. In addition, thanks to the overall configuration, hull contact with the cushioning elements or wheels is maintained during the typical horizontal and vertical use.

It will be appreciated that the various elements may be made of non-rusting, galvanized steel or stainless steel, or aluminum, various plastics, or other materials, for example, to maximize useful life.

Mounting bracket may include a galvanized steel plate, and may be used and secured by fasteners, such as lag bolts, or through bolts, and may encompass a substantially rigidly connected adjustable horizontal galvanized steel arm for use a the extension.

The cushioning elements and tires may be conventional, such as a tire mounted on a rim and a hub.

While this invention has been described as having a preferred design, it is understood that it is capable of further modifications, and uses and/or adaptions of the invention and following in general the principle of the invention and including such departures from the present disclosure as come within the known or customary practice in the art to which the invention pertains, and as may be applied to the central features hereinbefore set forth, and fall with in the scope of the claims.

The invention claimed is:

1. A vessel protection device, comprising:
   a) a mounting arm being provided, the mounting arm being configured for being attached to a fixed object;
   b) a cushioning element being provided, the cushioning element being configured and disposed for engaging a vessel;
   c) the cushioning element including a first cushioning element and a spaced apart second cushioning element;
   d) a spring provided between the mounting arm and the cushioning element, the spring supporting the cushioning element, and the spring being a leaf spring having first and second spaced apart free ends;
   e) the first cushioning element being rotatably attached to the first free end of the leaf spring, and the second cushioning element being rotatably attached to the second free end of the leaf spring; and
   f) the leaf spring and the mounting arm being disposed, so that the first cushioning element and the second cushioning element are provided at a desired offset from the fixed object, in use, so that the first cushioning element engages a first portion of the vessel and the second cushioning element engages a second portion of the vessel spaced apart from the first portion of the vessel, in use, so that the first cushioning element and the second cushioning element cushioning element sufficiently engage the vessel in a desired orientation, in use, during both constant and changing water levels, and under both constant and changing wind and water force conditions, and so that the engaged vessel is prevented from contacting the fixed object, in use.

2. Vessel protection device as in claim 1, wherein:
   a) the mounting arm includes an adjustable mounting arm which has a variable orientation.

3. Vessel protection device as in claim 2, wherein:
   a) the cushioning element includes a gas-filled element.

4. Vessel protection device as in claim 2, wherein:
   a) the cushioning element includes an inflatable pneumatic tire.

5. Vessel protection device as in claim 2, wherein:
   a) the cushioning element includes an inflatable vehicle tire mounted on a rim.

6. Vessel protection device as in claim 2, wherein:
   a) a spacer is provided;
   b) the spacer is sufficiently large, strong, and rigid, so that, in use, if the cushioning element loses its ability to cushion, the spacer prevents a vessel engaged by the cushioning element from contacting the fixed object, in use, during both constant and changing water levels, and under both constant and changing wind and water force conditions.

7. Vessel protection device as in claim 2, wherein:
   a) the spring and the mounting arm are configured so that the cushioning element may be rotated from a substantially horizontal position, for use during guiding and docking of a vessel, to a substantially vertical position for using when a vessel is secured and docked.

8. Vessel protection device as in claim 1, wherein:
   a) the spring and the mounting arm are configured so that the cushioning element may be rotated from a substantially horizontal position, for use during guiding and docking of a vessel, to a substantially vertical position for using when a vessel is secured and docked.

9. Vessel protection device as in claim 3, wherein:
   a) an extension is provided; and
   b) the mounting arm is provided between the extension and the spring, and the mounting arm is detachably attached to the extension for varying the length of the mounting arm and extension.

10. Vessel protection device as in claim 2, wherein:
    a) an extension is provided; and
    b) the mounting arm is provided between the extension and the spring, and the mounting arm is detachably attached to the extension for varying the length of the mounting arm and extension.

11. Vessel protection device as in claim 1, wherein:
    a) an extension is provided; and
    b) the mounting arm is provided between the extension and the spring, and the mounting arm is detachably attached to the extension for varying the length of the mounting arm and extension.

* * * * *